United States Patent
Weissman et al.

(10) Patent No.: US 6,622,663 B2
(45) Date of Patent: Sep. 23, 2003

(54) FUEL COMPOSITION SUPPLY MEANS FOR DRIVING CYCLE CONDITIONS IN SPARK IGNITION ENGINES

(75) Inventors: Walter Weissman, Basking Ridge, NJ (US); Randall D. Partridge, Califon, NJ (US); Bhupender S. Minhas, Bel Air, MD (US); Guido Sartori, Annandale, NJ (US); Takanori Ueda, Shizuoka (JP); Yoshihiro Iwashita, Shizuoka (JP); Kazuhiro Akihama, Aichi (JP); Satoshi Yamazaki, Aichi-gun (JP)

(73) Assignees: ExxonMobil Research and Engineering Company, Annandale, NJ (US); Toyota Jidosha Kabushiki Kaisha, Aichi-ken (JP); Kabushiki Kaisha Toyota Chuo Kenkyusho, Aichi-ken (JP)

(*) Notice: Subject to any disclaimer, the term of this patent is extended or adjusted under 35 U.S.C. 154(b) by 0 days.

(21) Appl. No.: 09/818,203

(22) Filed: Mar. 27, 2001

(65) Prior Publication Data

US 2002/0139321 A1 Oct. 3, 2002

(51) Int. Cl.$^7$ .............................. F02B 13/00
(52) U.S. Cl. ........................ 123/1 A; 123/582
(58) Field of Search ................. 123/582, 1 A

(56) References Cited

U.S. PATENT DOCUMENTS

| | | | | |
|---|---|---|---|---|
| 1,552,995 A | * | 9/1925 | McKenzie-Martyn | 123/582 |
| 2,947,687 A | | 8/1960 | Lee et al. | 210/23 |
| 3,043,891 A | | 7/1962 | Stuckey | 260/674 |
| 3,556,991 A | | 1/1971 | Gerhold | 208/321 |
| 3,850,153 A | * | 11/1974 | Sigwald | 123/582 |
| 3,972,324 A | * | 8/1976 | Marsee | 123/582 |
| 4,031,864 A | * | 6/1977 | Crothers | 123/1 A |
| 4,114,374 A | * | 9/1978 | Tanahashi | 123/582 |
| 4,114,572 A | * | 9/1978 | Matsuda et al. | 123/582 |
| 4,532,029 A | | 7/1985 | Black et al. | 208/308 |
| 4,798,674 A | | 1/1989 | Pasternak et al. | 210/640 |
| 4,802,987 A | | 2/1989 | Black | 210/640 |
| 4,846,977 A | | 7/1989 | DeVellis et al. | 210/640 |
| 4,944,880 A | | 7/1990 | Ho et al. | 210/640 |
| 4,962,271 A | | 10/1990 | Black et al. | 585/819 |
| 4,997,906 A | | 3/1991 | Thaler et al. | 528/272 |
| 5,019,666 A | | 5/1991 | Sartori et al. | 585/819 |
| 5,055,631 A | | 10/1991 | Sartori et al. | 585/819 |

(List continued on next page.)

FOREIGN PATENT DOCUMENTS

| | | | | |
|---|---|---|---|---|
| EP | 424039 A1 | 4/1991 | | C07C/7/144 |
| EP | 046646 | 1/1992 | | |
| EP | 466469 A2 | 1/1992 | | C07C/7/144 |

(List continued on next page.)

OTHER PUBLICATIONS

Israel Cabasso, Organic Liquid Mixtures by Permselective Polymer Membranes 1. Selection and Characteristics of Dense Isotropic Membranes Employed in the Pervaporation Process, , The Polymer Research Institute, State University of New York, College of Environmental Science and Forestry, Syracuse, New York, Ind. Eng. Chem. Prod. Res. 1983, 22, 313–319.

Literature Reference—R. Chicurel, A Dual Fuel System to Provide a Variable Octane Mixture to an Engine, Universidad Nacional Autonoma de Mexico, Energy V18 N.6, 611–14, Jun. 1993.

Primary Examiner—Gene Mancene
Assistant Examiner—Jason Benton
(74) Attorney, Agent, or Firm—Paul E. Purwin

(57) ABSTRACT

A fuel system for on-board vehicle fuel separation to supply engine fuel compositions formulated as a function of driving cycle conditions. The invention results in improvements in one or more of feed efficiency and combustion emissions.

20 Claims, 2 Drawing Sheets

U.S. PATENT DOCUMENTS

| | | | |
|---|---|---|---|
| 5,288,712 A | 2/1994 | Chen | 210/640 |
| 5,354,344 A | 10/1994 | Takizawa et al. | |
| 5,396,019 A | 3/1995 | Sartori et al. | 585/819 |
| 5,498,823 A | 3/1996 | Noble et al. | 585/818 |
| 5,635,055 A | 6/1997 | Sweet et al. | 208/99 |
| 5,643,442 A | 7/1997 | Sweet et al. | 208/302 |
| 5,905,182 A | 5/1999 | Streicher et al. | 585/804 |

FOREIGN PATENT DOCUMENTS

| | | | | |
|---|---|---|---|---|
| EP | 466470 A2 | 1/1992 | | C07C/7/144 |
| EP | 583957 A2 | 2/1994 | | B01D/71/32 |
| EP | 105798 | 6/2002 | | |
| JP | 610650 | 3/1986 | | F02M/37/00 |
| JP | 05312112 | 11/1993 | | F02M/33/00 |
| JP | 05312115 | 11/1993 | | F02M/33/00 |
| JP | 09068061 A2 | 3/1997 | | |
| JP | 11-315733 | 11/1999 | | |
| JP | 11315733 A2 | 11/1999 | | |
| JP | 2000179368 A2 | 6/2000 | | |
| JP | 2000249015 | 9/2000 | | F02M/43/04 |
| JP | 2001050070 A | 2/2001 | | F02D/19/08 |
| WO | 0047697 | 8/2000 | | |

\* cited by examiner

FUEL COMPOSITION SUPPLY MEANS FOR DRIVING CYCLE CONDITIONS IN SPARK IGNITION ENGINES

FIELD OF INVENTION

The present invention relates generally to a means for supplying engine fuel compositions and their use in spark ignition, internal combustion engines especially those having a compression ratio (CR) of 11 or more. The engine fuel supply is tailored to meet the engine's drive cycle conditions, including load and speed.

BACKGROUND OF INVENTION

Both petroleum refineries and engine manufacturers are constantly faced with the challenge of continually improving their products to meet increasingly severe governmental efficiency and emission requirements, and consumers' desires for enhanced performance. For example, in producing a fuel suitable for use in an internal combustion engine, petroleum producers blend a plurality of hydrocarbon containing streams to produce a product that will meet governmental combustion emission regulations and the engine manufacturers performance fuel criteria, such as research octane number (RON). Similarly, engine manufacturers conventionally design spark ignition type internal combustion engines around the properties of the fuel. For example, engine manufacturers endeavor to inhibit to the maximum extent possible the phenomenon of auto-ignition which typically results in knocking and, potentially engine damage, when a fuel with insufficient knock-resistance is combusted in the engine.

Under typical driving situations, engines operate under a wide range of conditions depending on many factors including ambient conditions (air temperature, humidity, etc.), vehicle load, speed, rate of acceleration, and the like. Engine manufacturers and fuel blenders have to design products which perform well under virtually all such diverse conditions. This requires compromise, as often times fuel properties or engine parameters that are desirable under certain speed/load conditions prove detrimental to overall performance at other speed/load conditions. Conventionally, vehicular fuels are supplied in two or three grades, typically distinguished by their Research Octane Number, or RON. Generally, the selection of fuel grade is based upon the engine specifications. However, once the fuel is "on board", it becomes a "one fuel fits all" and must be designed to accommodate diverse speed, load and other driving conditions.

One object of this invention is to employ a fuel supply system using a membrane for segregating octane boosting constituents from a main fuel tank or reservoir, then admixing the segregated fuel to the main fuel supply in response to engine drive cycle conditions.

Another object of this invention to establish a procedure for providing an engine with fuels specifically designed to enhance engine performance at low and high load engine conditions from a single fuel delivered to the vehicle.

Also, spark ignition engines are generally designed to operate at a compression ratio (CR) of 10:1 or lower to prevent knocking at high load. Compression Ratio (CR) is defined as the volume of the cylinder and combustion chamber when the piston is at Bottom Dead Center (BDC) divided by the volume when the piston is at Top Dead Center (TDC). As is known, higher CRs, up to about 18:1, are optimum from the standpoint of maximizing the engine thermal efficiency across the load range. A higher CR leads to greater thermal efficiency by maximizing the work obtainable from the theoretical Otto (engine compression/expansion) cycle. Higher CRs also lead to increased burn rates, giving a further improvement in thermal efficiency by creating a closer approach to this ideal Otto cycle. The use of high compression ratio spark ignition engines, however, is limited by insufficiently high fuel octane, as in practice it is difficult to supply a single fuel with sufficiently high octane overall to allow for a significant increase in compression ratio without having engine knocking at high loads.

Therefore, another objective of this invention is to facilitate the use of high compression ratio engines that realize greater thermal efficiency across the entire driving cycle without the problem of knocking at high load by supplying a specifically formulated fuel derived from the fuel supplied to the vehicle.

In theory, higher efficiency engine operation at certain moderate to high loads can be achieved by adjusting the spark ignition timing closer to the value that provides minimum spark advance for best torque or maximum brake torque (MBT). Experience has shown, however, that adjusting the ignition timing to allow MBT to be reached is not practical since knocking typically occurs under conditions of moderate to high load at timings earlier than MBT with commercially available gasolines. In principle, operating with a very high octane fuel would allow running the engine at MBT across the drive cycle. However, a preferred approach is to supply the engine with a fuel that has sufficient octane to approach or operate at MBT without knocking, together with other combustion properties tailored to optimize performance. The fuel supply system taught herein separates or extracts constituents of the supply fuel that have or can impart sufficient octane to approach or operate at MBT under varied engine load conditions.

Yet another object of the invention is to provide fuel compositions that allow adjusting the spark ignition timing closer to that which provides MBT.

Presently spark ignition engines are capable of operating with known fuels at a normalized fuel to air ratio ("$\phi$") below 1.0 under low to moderate load conditions. The normalized fuel to air ratio is the actual fuel to air ratio divided by the stoichiometric fuel to air ratio. In addition, these engines can be operated with exhaust gas recycle (EGR), as the "leaning out" diluent, at a $\phi$ of 1.0 or lower. EGR is understood to include both recycled exhaust gases as well as residual combustion gases. An obstacle to operating the engine under such lean conditions is the difficulty of establishing a rapid and complete burn of the fuel.

Another object of this invention therefore is to provide a lower octane, lower autoignition resistant, higher laminar flame speed, high burn rate fuel for use under lean conditions to shorten the burn duration and thereby improve the thermodynamic efficiency. A faster burn rate also serves to maximize conversion of the fuel, thereby increasing the overall fuel economy and reducing emissions. As known in the art, autoignition of the fuel at sufficiently high loads can pose a threat of mechanical damage to the engine, i.e., knocking. However, at certain low load conditions, for example lean stratified operation, autoignition of the fuel can be beneficial to overall engine operation by optimizing burn characteristics that result in reduced engine emissions and higher efficiency.

The membrane separation or segregation process entails contacting a surface of the membrane with the feed material. Membrane composition is selected to permeate specific constituents of the feed. Those constituents sorbs onto and into the membrane surface region. These constituents then diffuse or migrate to the opposite surface of the membrane.

Other objects of the invention and their attendant advantages will be apparent from the reading of this specification.

SUMMARY OF INVENTION

One aspect of the invention is a system for separating or segregating fuel constituents from the primary fuel tank of a vehicle to supply particularly formulated fuel to meet engine needs under varying drive cycle conditions. An objective of the invention is the provision of a plurality of unleaded fuel compositions separated or segregated from a single fuel supply or reservoir, for use in operating a spark ignition, internal combustion engine, especially an engine having a CR of 11 or more, each of which compositions have different predetermined combustion properties suitable for use under preselected engine operating conditions to improve one or more of fuel efficiency and combustion emissions. The invention uses a membrane to separate an aromatics rich fuel from the fuel contained in the primary tank or reservoir. The membrane functions to preferentially separate aromatic permeate from the remaining retentate. The high aromatic content permeate provides a source of increased RON fuel that is selectively admixed or run separately to the engine fuel supply at high and moderate engine load conditions.

In one embodiment a pervaporation membrane process is employed to segregate at least a first and second fuel composition from a single fuel tank, the first fuel having combustion properties sufficient to improve combustion thereof (relative to the original tank fuel) under high and moderate engine load conditions and the second fuel having combustion properties sufficient to operate the engine under low engine load conditions.

The pervaporation process, as generally known in the art, relies upon vacuum on the permeate side of the membrane to evaporate the permeate from the surface of the membrane. The vapor phase permeate may then be condensed to liquid form.

Especially preferred fuels for use under low load conditions are those unleaded fuels boiling in the gasoline boiling range that have a RON less than 90 and an average burn rate in the engine, defined as 1/crank angles for 90% burn completion, >105% of isooctane at this time in the engine operating cycle and a laminar flame speed >105% of isooctane measured at a temperature and pressure representative of conditions in the engine at or about this time in the engine operating cycle.

Especially preferred fuels for use under high load conditions are those unleaded fuels boiling in the gasoline boiling range that have a RON greater than 100 and an average burn rate in the engine, defined as 1/crank angles for 90% burn completion, >105%% of isooctane at this time in the cycle and a laminar flame speed >105%% of isooctane measured at a temperature and pressure representative of conditions engine at or about this time in the engine operating cycle.

In view of the foregoing it will be readily appreciated that a wide range of modifications and variations of the invention are within the broad aspects set forth above and the unique scope of the invention will become even more apparent upon a reading of the detailed description which follows.

DETAILED DESCRIPTION OF INVENTION

Figure 1:
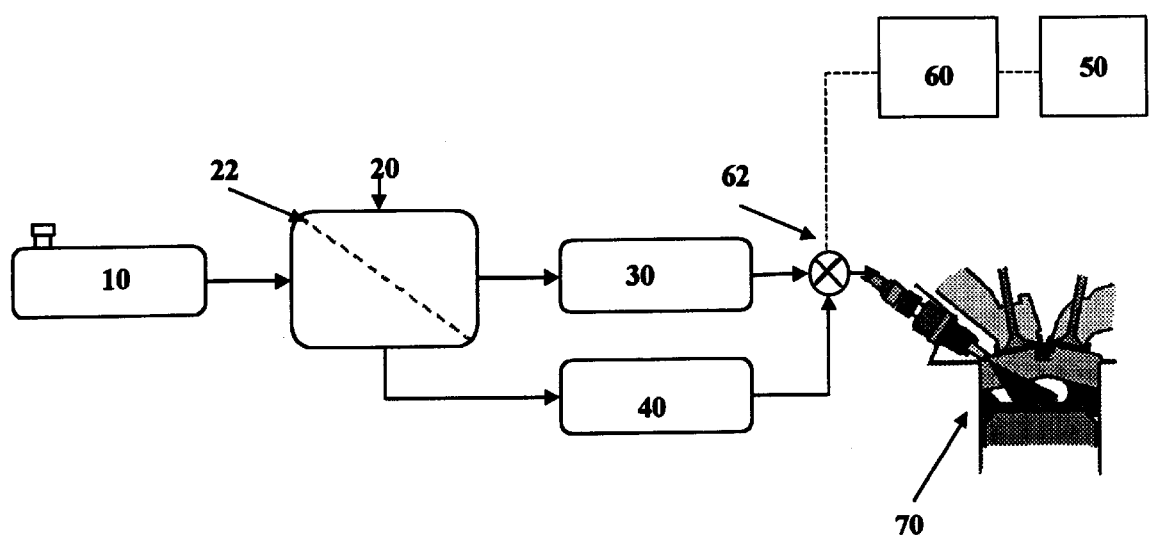
FIG. 1 illustrates a fuel separation system of the invention.

As is well known in the art, gasoline fuels generally are composed of a mixture of hydrocarbons boiling at atmospheric pressure in the range of about 77° F. (25° C.) to about 437° F. (225° C.). Typically gasoline fuels comprise a major amount of a mixture of paraffins, cycloparaffins, olefins and aromatics, and lesser, or minor amounts of additives including oxygenates, detergents, dyes, corrosion inhibitors and the like. Typically also, gasoline fuels are formulated to have a RON of about 98 for premium grade and about 92 for regular grade and are used alone in a vehicle engine; the grade used normally depending upon the vehicle manufacturer's recommendation.

The present invention departs form the practice of formulating a single fuel for a specific vehicle engine. Indeed, the present invention is based on the discovery that significant benefits can be achieved by providing a range of fuel compositions having combustion properties tailored to the engine's specific operating condition, and means to supply the particularly formulated fuel composition with the vehicle having a single supply fuel.

The fuel compositions of the invention are unleaded fuels boiling in the gasoline range and capable of being used in port or direct fuel injection, spark ignition, internal combustion engines especially those having a CR of 11 or higher.

In one embodiment the fuel compositions will comprise at least one first fuel and a second fuel. The first fuel will have a RON greater than 100, and a burn rate greater than 105% of isooctane at the high load end of the cycle and a laminar flame speed of greater than 105% of isooctane measured at a temperature and pressure representative of conditions in the engine at the high end of the load scale. The second fuel will have a RON less than 90, a burn rate greater than 105% of isooctane at the low end of the cycle and a laminar flame speed greater than 105% of isooctane measured at a temperature and pressure representative of conditions in the engine at the low end of the load scale.

The laminar flame speed of the fuel compositions is measured by combustion-bomb techniques that are well known in the art. See, for example, M. Metghalchi and J. C. Keck, Combustion and Flame, 38:143–154 (1980).

A particularly useful unleaded fuel for operating the engine in the high load portion of the drive cycle comprises a mixture of hydrocarbons boiling in the gasoline range with an RON >100 and containing greater than about 45 vol. %. aromatics and preferably greater than about 55 vol. %

Fuels meeting the foregoing characteristics provide efficiency benefits for various types of spark ignited internal combustion engines when operating under high load conditions. High load conditions are defined as being those regions of the engine operating map where at MBT spark timing knocking occurs with a gasoline of RON 98. Knocking is defined as autoignition under sufficiently severe in-cylinder conditions that it results in a detonation that poses a risk of mechanical damage to the engine.

A particularly useful unleaded second fuel for operating the engine in the low load portion of the drive cycle comprises a mixture of hydrocarbons boiling in the gasoline range having an RON <90 and containing less aromatics than the first fuel, for example, less than about 45 vol. % aromatics and preferably less than 20 vol. %.

In the case of spark ignition engines, use of fuels having the properties of the first fuel above permits the engine to be designed to operate at a CR of 11 or more and permits advance spark timing closer to that for MBT. These design features enhance overall cycle efficiency, i.e., provide improved fuel economy.

More particularly these benefits are achieved with direct fuel injection engines and especially direct injection, lean burn engine systems, such as stratified charge direct injection systems. Stratified charge is an in-cylinder condition wherein there is an inhomogenoeus air:fuel ratio distribution. As is known, "lean burn" engines operate at normalized fuel to air ratios ("φ") of below 1.0 and/or with exhaust gas recycle as the "leaning out" diluent, at a φ of 1.0 or lower.

Fuels having the combustion properties of the second fuel above are suitable for use especially in the operation of spark ignition engines, included stratified fuel systems, operating under low load conditions with exhaust gas recycle. Low engine load conditions are those regions of the engine operating map at or below which the engine can be operated at MBT timing with a fuel having a RON of approximately 90 without the condition of knocking as defined above.

Fuels having a range of combustion properties between the first and second fuel offer even more complete tuning of the fuel compositions to engine operating conditions. Indeed, a third fuel composition can be provided having a RON between those of the first and second fuel, and most desirably a burn rate greater than 105% of isooctane at the medium load end of the cycle and most desirably a laminar flame speed of greater than 105% of isooctane measured at a temperature and pressure representative of conditions in the engine at the medium end of the load scale. Such a fuel can be used under moderate engine load conditions, i.e., conditions between high and low load conditions.

The above described fuels are supplied by a fuel system that utilizes a membrane and a pervaporation process to segregate RON and octane boosting constituents from an on-board fuel supply, then selectively admixing the relatively high RON/octane fuel to the regular engine fuel supply responsive to engine drive cycle conditions. This is best illustrated by references to the figure, wherein FIG. 1 depicts an on-board fuel separation system, as taught in the present invention. In FIG. 1, fuel tank 10 serves as a primary fuel supply source. Conventionally, fuel tank 10 stores and supplies gasoline, whose RON may range from 88–100 for varying grade fuels. Fuel is supplied from the fuel tank 10 to the membrane apparatus 20. The membrane material, illustrated by 22, is chosen to selectively permeate relatively high RON and octane constituents of gasoline, including for example those constituents of gasoline ordinarily referred to as "aromatics". The permeate constituents segregated by the membrane apparatus 20 are supplied to a high octane accumulator 30, while the retentate is supplied to a low octane accumulator 40. In accordance with one aspect of this invention, engine drive cycle conditions including load (measured in torque), speed (measured in revolutions per minute), spark advance (measured in degrees before or after top dead center, i.e., BTDC or ATDC), intake manifold and exhaust manifold temperature and pressure, knock sensor response, and other engine driving cycle conditions are monitored by sensing system depicted by 50. An admix controller, responsive to the engine drive cycle conditions selectively operates a mixing valve 62 to deliver fuel from the low octane accumulator, the high octane accumulator, or a mixture thereof. The separated or admixed fuel is supplied to an engine fuel injection system depicted at 70.

The invention employs a membrane pervaporation process and particularly selected membrane to segregate high-octane fuel constituents from primary fuel. Accordingly, membrane 22 is selected from membrane materials to include the following preferable characteristics:

i. permeance to selected constituents of gasoline, particular those having RON and octane boosting properties (e.g. aromatics) and flame speed enhancing properties.
  ii. capable of withstanding temperatures as high as 250° C.
  iii. capable of withstanding pressure differentials, when supported, as great as 200 bar. Suitable membranes include polysulfone membranes such as bisphenol-A polysulphone, polyethersulfone membranes, crosslinked polysulfane membranes, polyamide/polyadiapate, polyimide/polysuccinate. polyimide/polymalonate, polyimide/polyoxalate, polyimide/polyglutarate, polyvinylfluoride and polyvinylene fluoride and supported composite based membranes using these or appropriate other selective layers.

The above described fuels are supplied by a fuel system that utilizes a membrane and a pervaporation process to segregate RON and octane boosting constituents from an on-board fuel supply, then feeding separately or selectively admixing the relatively high RON/octane fuel to the regular engine fuel supply responsive to engine drive cycle conditions. This is best illustrated by references to the figures, wherein FIG. 1 depicts an on-board fuel separation system, as taught in the present invention. In FIG. 1, fuel tank 10 serves as a primary fuel supply source. Conventionally, fuel tank 10 stores and supplies gasoline, whose RON may range from 90 for "regular" grade fuel, to 98 for premium grade fuel. Fuel is supplied from the fuel tank 10 to the membrane apparatus 20. The membrane material, illustrated by 22, is chosen to selectively permeate relatively high RON and octane constituents of gasoline, including for example those constituents of gasoline ordinarily referred to as "aromatics". The permeate constituents segregated by the membrane apparatus 20 are supplied to a high octane accumulator, while the retentate is supplied to a low octane accumulator 40. In accordance with one aspect of this invention, engine drive cycle conditions including load (measured in torque), speed (measured in revolutions per minute), spark advance (measured in degrees before or after top dead center, i.e., BTDC or ATDC), intake manifold and exhaust manifold temperature and pressure, knock sensor response, and other engine during cycle conditions are monitored by sensing depicted by 50. An admix controller, responsive to the engine drive cycle conditions selectively operates a mixing valve 62 to admix fuel from the high and low octane accumulators. The admixed fuel is supplied to an engine fuel injection system depicted at 70.

Figure 2:
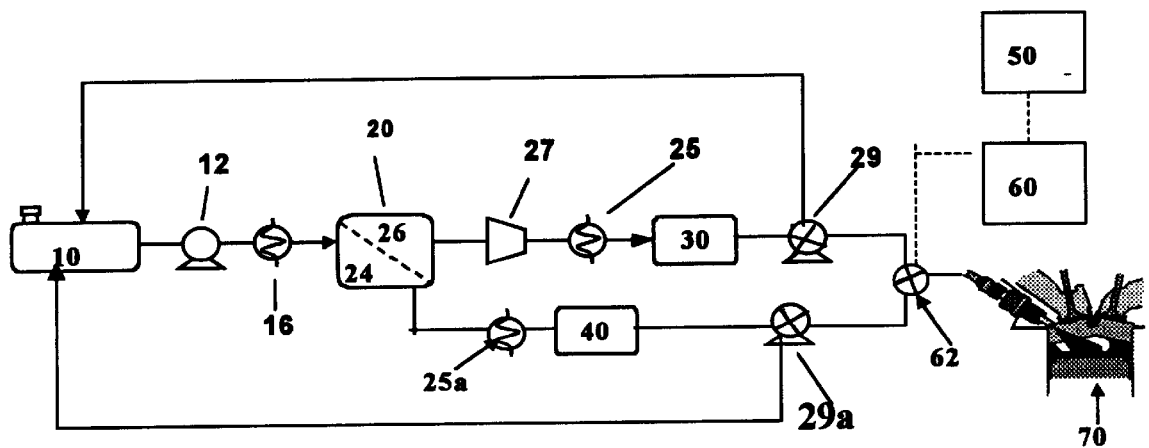
FIG. 2 illustrates a membrane fuel separation system of the invention.

Referring to FIG. 2, there is schematically shown a fuel supply system for supplying two or more fuels having specifically formulated properties. In FIG. 2, fuel tank 10 stores and supplies conventional fuel such as gasoline. A fuel pump 12 may be used to pump fuel at increased pressure to the membrane apparatus 20. As detailed hereinafter, operation of membrane 22 may be improved by pressurization of the fuel contacting the membrane on the retentate side, here shown at 24. Accordingly, fuel pump 12 may be utilized to supply pressurized fuel to the membrane apparatus 20 at pressures ranging from about 1.5 to 20 bar and preferably from about 2 to 10 bar. A flow control means 14 may be used to control or regulate the fuel flow from the fuel tank 10 to the membrane apparatus 20.

As further detailed below, the functioning of membrane 22 is influenced by the temperature of the membrane, which may be preferentially heated to improve or control the permeation rate through the membrane. Therefore, in a preferred embodiment a heater 16 is provided to heat the fuel and membrane apparatus 20 providing sufficient sensible heat to maintain the membrane at the desired outlet temperature, while providing the heat need for vaporization of the permeate.

Retentate 24 from the membrane apparatus 20 may be cooled by means of a heat exchanger 25*a*. Cooling of the retentate 24 may be advantageously made by heat exchange against the ambient fuel 10 flowing to the heater 16. This also serves to preheat the fuel to the heater 16. As stated above, the pervaporation process relies upon a vacuum on the permeate side of the membrane, here shown as 26, to help drive the membrane process. Accordingly, a vacuum pump 27 and optimal vacuum pump regulator valve 28 may be used to provide a vacuum to the permeate side of the membrane, here shown as 26. The vacuum maintained on the permeate side of the membrane may range from about 0.05 bar to about 0.9 bar, preferably from about 0.05 bar to about 0.5 bar.

In one embodiment, membrane 22 comprises a polyamide/polyadiapate membrane selected to preferentially permeate aromatic constituents of gasoline. The gasoline, comprising conventional "regular grade" 92 RON having less than or equal to about 35% aromatic content, is separated into a first high octane/RON fuel having up to about sixty-five percent (65%) aromatic content and a RON in excess of about 100 RON. The second or retentate fuel has a RON ranging from about 80 to about 85.

The permeate from membrane 26 is vaporized upon departing the membrane 22. To return the vapor permeate to a liquid form, condensing means 25 may comprise a cooling device such as a compact heat exchanger using ambient air as the cooling media. The permeate, now in predominately liquid form, is supplied to the high octane accumulator 30. A pump means 29 may be utilized to supply the condensed permeate fuel from the high octane accumulator to the mixing device 62 and thereafter to the fuel injection system. Similarly, an optional pump means 29*a* may be used to pressurize the retentate to up to 200 bar to supply pressurized fuel to the mixing device 62 and then to the fuel injection system, including conventional port fuel injection and higher pressure direct injection systems. A fill sensing device 31 may be used to identify when the high octane accumulator is filled, and function to either reduce the volume of permeate through the membrane, return amounts of the high octane permeate to the fuel tank 10 or a combination thereof. Similarly, when octane accumulator 40 is filled, excess amount of such fuel may be returned to the fuel tank 10 as shown in the figure.

The retentate low RON fuel leaving the membrane apparatus 20 is supplied to the low RON accumulator 40.

As described above, the high RON fuel is admixed to the low RON fuel at 62 whenever engine drive cycle needs require fuel whose RON or octane requirements are higher than that supplied by the second or retentate fuel from low RON accumulator 40.

What is claimed is:

1. A fuel system for supplying a plurality fuels for use in spark ignition, internal combustion engine having a fuel supply comprising:
   a membrane in operable communication with the fuel supply for separating said fuel supply into at least a first fuel and a second fuel in which the first fuel has a RON greater than 100, and an average burn rate greater and a laminar flame speed greater than 105% of isooctane;
   means for supplying the first fuel to the engine under high load conditions; and, means for supplying the second fuel to the engine at other than high load conditions.

2. A fuel system for supplying a plurality of unleaded fuels for use in a spark ignition, internal combustion engine having a CR of 11 or more comprising
   a fuel supply, a membrane in operable communication with the fuel supply for separating said fuel supply into at least a first fuel, and a second fuel, in which the second fuel has a RON less than 90, and a burn rate and a laminar flame speed greater than 105% of isooctane;
   means for supplying the second fuel to the engine at low load conditions; and,
   means for supplying the first fuel to the engine at other than low load conditions.

3. A system for supplying in situ formulated fuels boiling in the gasoline range for use in operating a spark ignition, internal combustion engine having a CR of 11 or more comprising:
   a fuel supply; a membrane in operable communication with the fuel supply for separating said fuel supply into at least a first fuel and a second fuel, in which the first fuel having a RON greater than about 100 and the second fuel having a RON less than about 90, both fuels having, an average burn rate greater than 105% of isooctane and a laminar flame speed greater than 105% of isooctane;
   means for supplying at least a portion of the first fuel to the engine at high load condition; and
   means for supplying at least a portion of the second fuel to the engine at low load conditions.

4. The fuels system of claim 3 admixing from the first and second fuel in a preselected ratio to obtain a third fuel having a RON between that of the first and second fuel.

5. The fuel system of claim 3 wherein said membrane is selected to preferentially permeate aromatics whereby said first fuel comprise greater than about forty-five volume percent aromatics.

6. The fuel system of claim 5 wherein said fuel supply is a reservoir of gasoline and wherein said second fuel comprise less than about forty-five percent aromatics.

7. The fuel system of claim 6 wherein said first fuel comprises greater than about fifty five volume percent aromatics.

8. The fuel system of claims 3 and 4 wherein said membrane is selected from the group consisting of bisphenol-A polysulphone, polyethersulfone membranes, crosslinked polysulfane membranes, polyamide/polyadiapate, polyimide/polysuccinate, polyimide/polymalonate, polyimide/polyoxalate, polyimide/polyglutarate, polyvinylfluoride and polyvinylene fluoride and composites thereof.

9. The fuel system of claim 8 wherein the membrane is supported.

10. The fuel system of claim 9 including means to control permeate side pressure of the membrane in the range of from about 0.05 bar to about 0.5 bar.

11. The fuel system of claim 10 including means to control retentate side pressure of the membrane in the range of from about 2 bar to about 200 bar.

12. The fuel system of claim 11 wherein the pressure is controlled at from about 3.5 bar to about 15 bar.

13. The fuel system of claim 12 wherein said first and second fuel is pressurized at up to 200 bar for supplying a port fuel injection or direct fuel injection system.

14. The fuel system of claim 4 wherein said admixing is predetermined based upon operating said engine at about MBT.

15. The fuel system of claim 3 wherein said membrane is selected to preferentially permeate aromatics whereby said second fuel comprises less than about twenty volume percent aromatics.

16. A method for operating a vehicle having a spark ignition engine to increase the efficiency and reduce the emissions of the engine under conditions of use comprising:

supplying a fuel to a fuel separation means;

separating said fuel into at least first and second fuel by means of a membrane that preferentially permeates aromatics;

the first fuel having a RON greater than 100, a burn rate greater than 105% of isooctane and a laminar flame speed greater than 105% of isooctane;

the second fuel having a RON less than 90, a burn rate greater than 105% of isooctane and a laminar flame speed greater than 105% of isooctane; and supplying at least a first fuel to the engine at about high engine load conditions; and supplying at least a second fuel to the engine at about low engine load conditions, whereby engine efficiency is increased and emissions are reduced.

17. The method of claim 16 wherein the fuel separation means is a pervaporation membrane selected from the group consisting of bisphenol-A polysulphone, polyethersulfone membranes, crosslinked polysulfane membranes, polyamide/polyadiapate, polyimide/polysuccinate, polyimide/polymalonate, polyimide/polyoxalate, polyimide/polyglutarate, polyvinylfluoride and polyvinylene fluoride and composites thereof.

18. The method of claim 17 including means for admixing the first fuel and the second fuel in a preselected ratio to obtain a third fuel having a RON between those of the first fuel and the second fuel.

19. The method of claim 18 including means for determining operation of the engine at MBT, and adjusting the preselected ratio to operate the engine at about MBT.

20. A fuel system for a motor which having a spark regulation, interval combination engine having a CR of 11 or more comprising:

a fuel tank for storage or fuel therein;

a membrane separation device in operable communication with the fuel tank and capable of separating a primary fuel into a fuel having a RON higher than the previous fuel first and second fuel having a RON lower than the previous fuel;

means for supplying the primary fuel to the separation device when the engine is operating whereby the primary fuel is separated into a first fuel and a second fuel;

a first fuel accumulation and a second fuel accumulation operably connected to the separator device whereby first and second fuels are accumulated therein when previous fuel is supplied to the separation device;

means for sensing engine drive cycle conditions;

means for supplying the first fuel to the engine under a first preselected drive cycle conditions; and means for supplying the second fuel the engine under a second preselected driving cycle conditions.

* * * * *